Oct. 15, 1929.   W. MORAVA   1,731,826
COTTON PICKING MACHINE
Filed July 21, 1928   3 Sheets-Sheet 1
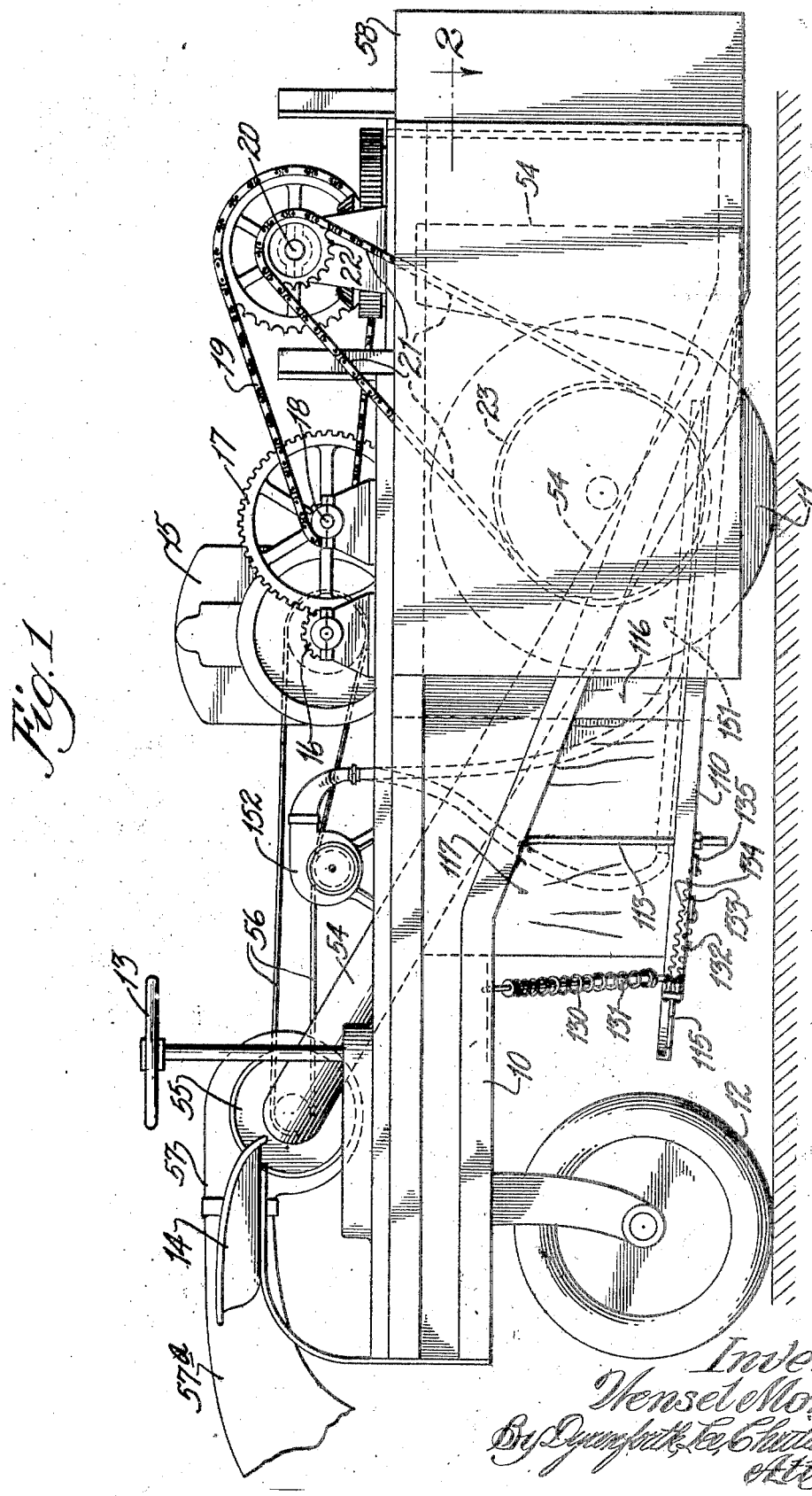

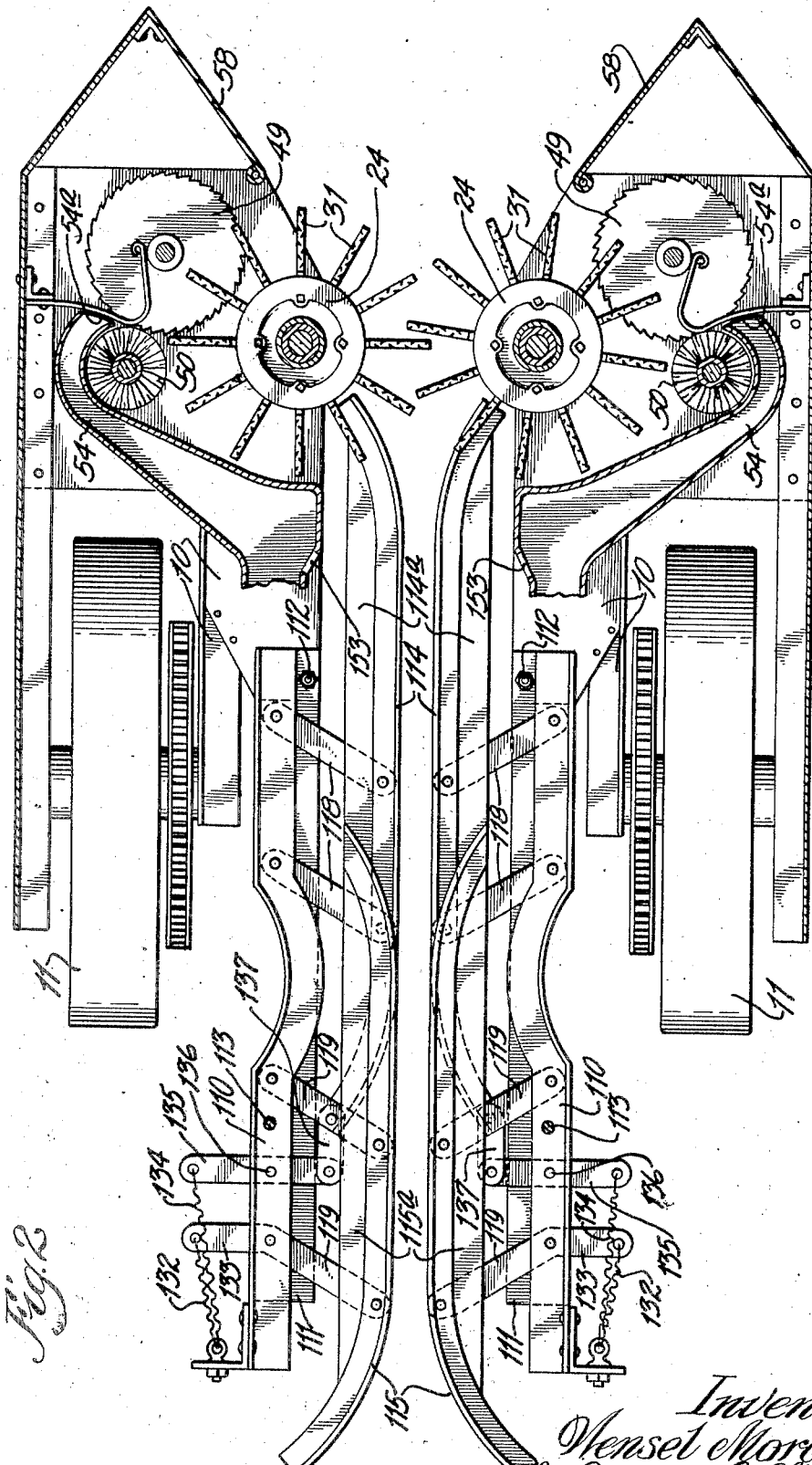

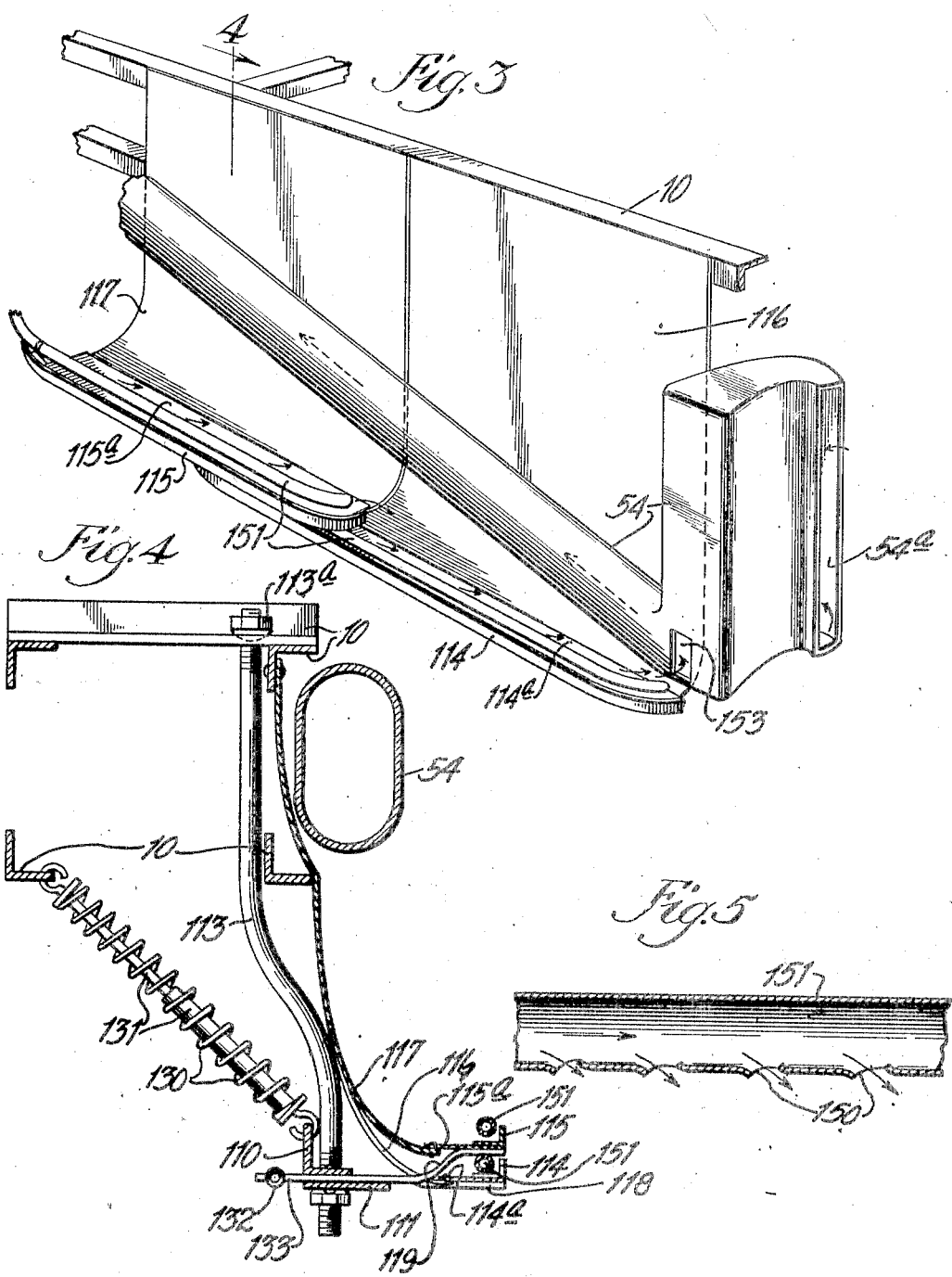

Patented Oct. 15, 1929

1,731,826

UNITED STATES PATENT OFFICE

WENSEL MORAVA, OF CHICAGO, ILLINOIS

COTTON-PICKING MACHINE

Application filed July 21, 1928. Serial No. 294,513.

This invention relates to improvements in cotton picking machines, and more especially to such a machine adapted for picking ripe cotton directly from the plants in the field.

In general, my machine resembles the machines disclosed in my prior United States Patent 1,668,247 issued May 1, 1928 and in my copending application, Serial No. 209,737, filed August 1, 1927, although the present machine has improvements over the older machines referred to. Since, however, in some respects the new machine is similar to these older machines, I shall not describe in detail the features which are the same or similar, but shall point out more particularly the improvements in the present machine.

One of the improvements in this new machine is the provision of shelves or troughs below and behind the rotating finger carrying cylinders, to catch cotton that falls down. Air suction means are provided for removing the cotton caught on these shelves or troughs to convey it back to the main bag. These troughs or shelves are also so constructed that they are permitted a certain amount of lateral movement so that they will lie close to the plants to catch any cotton that falls, and still not harm the plants in the event that some of the same are out of line. That is, upon contact with the stem of one of the plants, the trough or shelf is free to move over to one side temporarily. Spring means are provided for yieldingly holding the troughs rather close together so that the maximum amount of cotton will be caught by the same.

Other features and advantages of my invention will appear more fully as I proceed with my specification.

In that form of device embodying the features of my invention shown in the accompanying drawings, Figure 1 is a view in side elevation, Fig. 2 is a view of the forward part of the machine taken as indicated by the line 2 of Fig. 1, Fig. 3 is a view in perspective of one of the shelves or troughs, Fig. 4 is a view taken as indicated by the line 4 of Fig. 3, and Fig. 5 is a horizontal sectional view of a portion of the compressed air pipe.

As shown in the drawings, 10 indicates a suitable frame or chassis here shown as supported on the two forward wheels 11, 11 and the single rear steering wheel 12 mounted in the longitudinal center line of the machine, said wheel being controlled by a suitable hand steering wheel 13. 14 indicates a seat for the driver. 15 indicates a suitable motor as, for example, an internal combustion motor adapted to propel the machine itself and drive the cotton picking mechanism. The shaft of the motor carries the pinion 16 driving the gear 17 mounted on the control shaft 18. By means of a chain 19 and suitable sprockets the control shaft 18 drives the picking mechanism driving shaft 20. The machine is propelled by means of a chain 21 driven by a sprocket wheel 22 on the end of the shaft 20, which chain in turn drives one of the front wheels by means of the sprocket 23.

Suitable transmission gears, clutch and the like (not shown in detail) may be provided as desired.

The cotton picking mechanism in general is the same as that disclosed in the older machines referred to above and comprises two parallel vertically arranged adjacent cylinders 24, 24 rotating toward each other and carrying rotatable picking fingers 31.

Suitable mechanism is provided for stripping the picking fingers, or cleaning the cotton therefrom. This includes in general rotating saws 49 to take the cotton from the fingers and rotating brushes 50 to clean the cotton from the saws.

The cotton is freed from the brushes 50 by means of centrifugal force and carried away through suction pipes 54, a suitable suction being maintained by the fan 55 driven by the belt 56 from the motor 15. From the fan 55, the cotton is discharged through the pipe 57 to the bag 57ᵃ.

58, 58 indicate converging guide plates adapted to direct the plants toward the picking fingers and between the cylinders 24, 24 as the machine moves forward.

The ends of the suction pipes 54 terminate in nozzles 54ᵃ lying adjacent the brushes 50.

The parts and mechanism so far described resemble in general the older machines referred to above. I shall now describe more in detail the improvements on my present machine. These comprise shelves or troughs below, and behind the cylinders 24 with aprons projecting upwardly therefrom, such troughs and aprons serving to catch the cotton that falls from the fingers 31 or cotton which is not caught by such fingers. Since these aprons and shelves are the same on each side of the machine, I shall describe in detail but one side of the machine.

110 indicates an angle iron lying back of the cylinders 24 close to the ground, with the forward end somewhat lower than the rear end. Attached to the underside of the angle iron 110 is a flat bar or plate 111 which is somewhat wider than the lower flange of the angle iron. The forward end of the plate 111 is pivotally attached to a portion of the frame 10 by the bolt 112 and the rear end of the angle iron 110 is swingably supported by the bar 113 from an upper frame member 10. The upper end of the bar 113 projects through a large hole in the member 10 and is provided with a nut 113$^a$. The hole is enough larger that the bar 113 permits the lower end of the bar to swing.

Parallelly arranged with the members 110 and 111 are a forward and rear angle iron 114 and 115 respectively, which are substantially in alignment, the forward member being below the other. The ends of these members overlap as shown in Fig. 2. The angle irons 114 and 115 are provided on their lower surfaces with widened plates 114$^a$, 115$^a$ respectively, to permit attachment thereto of the lower edges of the aprons 116 and 117 respectively, the upper edges of such aprons being carried by one of the upper frame members 10.

The angle irons 114 and 115 are each connected to the angle iron 110 by a pair of parallel links 118 and 119 respectively, such links permitting the angle irons 114 and 115 to move toward or away from the angle irons 110 and still hold them parallel thereto.

It will be seen, therefore, that the angle iron 110 with its plate 111 and the angle irons 114 and 115 with their plates 114$^a$ and 115$^a$ are formed into parallelograms by the links 118 and 119 thus constituting in general a shelf or trough that is narrowed or widened by swinging of the connecting links 118 and 119. The aprons 116 and 117 have their lower edges connected to plates 114$^a$ and 115$^a$ and lie over the links referred to so that the shelves or troughs referred to above are covered by suitable cloth or fabric of which the aprons are composed.

The forward end of the entire shelf or trough as stated above, is pivotally attached at 112 and the rear end is swingably carried from one of the upper frame members by means of the bar 113. 130 indicates a spiral spring surrounding a telescoping bar 131 connecting a portion of the frame 10 to the rear end of the angle iron 110. The spring 130 serves to permit the lower end of the trough or shelf to be yieldingly pushed to one side in the event that cotton plants press against the frame. This swinging of the rear end of the frame is permitted by pivoting the same at the forward end at 112. Such swinging of the rear end of the frame is desirable to permit the machine to turn corners.

132 indicates a spring connected to an extension 133 on one of the links 119 to yieldingly hold the angle iron 115 away from the angle iron 110. 134 indicates a similar spring connected to one end of a lever 135 pivoted at 136, the other end of said lever 135 being joined by a link 137 connected to the rear end of the angle iron 114. This spring also yieldingly holds the angle iron 114 away from the angle iron 110 but also permits the same to be pressed toward said angle iron 110 when engaged by a cotton bush.

Cotton falling on the shelves or troughs described above is adapted to be concentrated at the forward end thereof by means of compressed air issuing from holes 150 in the pipe 151 which is supplied with compressed air by the fan 152. The suction pipe 54 is provided with an opening 153 at a point adjacent the front end of the shelves so that the cotton driven forward from the compressed air pipe 151 is sucked into the opening 153 to be discharged into the bag 57$^a$.

While I have shown and described certain embodiments of my invention, it is to be understood that it is capable of many modifications. Changes, therefore, in the construction and arrangement may be made without departing from the spirit and scope of the invention disclosed in the appended claims, in which it is my intention to claim all novelty in my invention as broadly as possible in view of the prior art.

What I claim is new, and desire to secure by Letters Patent, is:

1. In combination with a cotton picking machine of the character described having a frame and a pair of vertically arranged rotating cylinders with fingers thereon, a pair of longitudinally arranged substantially parallel shelves, supported by the frame, arranged behind said cylinders and adjacent the ground, said shelves lying between planes passing through the axes of said cylinders parallel with the direction of travel of the machine and with each other, said shelves being spaced from each other to permit relative movement of cotton plants therebetween, and means for removing cotton falling on said shelves.

2. Apparatus as claimed in claim 1 with aprons attached to said shelves at their lower edges, the upper edges of said aprons being carried by the frame of the machine.

3. Apparatus as claimed in claim 1 in which the means for removing the cotton from the shelves includes compressed air jets for concentrating the cotton at one end of the shelf with air suction means for removing the cotton from the point of concentration.

4. Apparatus as claimed in claim 1 in which the forward ends of the shelves are lower than the rear ends and in which the means for removing the cotton from the shelves includes compressed air jets for concentrating the cotton at the forward ends on the shelves and suction means for removing the cotton from the points of concentration.

5. Apparatus as claimed in claim 1, in which the forward ends of the shelves are pivotally supported and the rear ends are swingably carried by the frame of the machine, to permit lateral swinging of the rear ends of said shelves.

6. Apparatus as claimed in claim 1, in which the adjacent edges of the shelves are movably mounted with respect to the outer edges thereof, to permit separation of said adjacent edges by pressure from cotton plants.

7. Apparatus as claimed in claim 1, in which each shelf is formed of substantially parallel members connected by links to permit movement of said members toward and away from each other.

8. Apparatus as claimed in claim 1, in which each shelf is formed of two substantially parallel members connected by links to permit movement of said members toward and away from each other, with means for yieldingly holding said members in separated position.

9. In combination with a cotton picking machine of the character described having a frame and a pair of vertically arranged rotating cylinders with fingers thereon; a pair of longitudinally arranged substantially parallel members, supported by the frame, arranged behind said cylinders and adjacent the ground, the forward ends of said members being pivotally attached to the frame, and the rear ends of said members being swingably supported from said frame by vertical bars; a pair of members substantially parallel to said first mentioned members and connected thereto by parallel links, said second mentioned members lying in substantially the same plane with the first mentioned members and forming in conjunction therewith shelves for the reception of falling cotton; a fabric covering said shelves, the outer edges of said fabric being extended upwardly and supported by the frame to form aprons; and means for removing cotton falling on said shelves.

In witness whereof, I have hereunto set my hand this 2d day of July, 1928.

WENSEL MORAVA.